(12) United States Patent
Tojigamori et al.

(10) Patent No.: US 10,971,728 B2
(45) Date of Patent: Apr. 6, 2021

(54) AQUEOUS LITHIUM ION SECONDARY BATTERY, METHOD FOR PRODUCING ANODE ACTIVE MATERIAL COMPOSITE, AND METHOD FOR PRODUCING AQUEOUS LITHIUM ION SECONDARY BATTERY

(71) Applicant: TOYOTA JIDOSHA KABUSHIKI KAISHA, Toyota (JP)

(72) Inventors: Takeshi Tojigamori, Susono (JP); Hiroshi Nishiyama, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/892,776

(22) Filed: Jun. 4, 2020

(65) Prior Publication Data

US 2020/0295374 A1 Sep. 17, 2020

Related U.S. Application Data

(62) Division of application No. 16/037,555, filed on Jul. 17, 2018, now Pat. No. 10,741,844.

(30) Foreign Application Priority Data

Sep. 19, 2017 (JP) .............................. JP2017-179337

(51) Int. Cl.
 *H01M 4/62* (2006.01)
 *H01M 4/587* (2010.01)
 (Continued)

(52) U.S. Cl.
 CPC ......... *H01M 4/623* (2013.01); *H01M 4/0471* (2013.01); *H01M 4/139* (2013.01);
 (Continued)

(58) Field of Classification Search
 CPC ...................... H01M 4/623; H01M 2300/0002
 (Continued)

(56) References Cited

U.S. PATENT DOCUMENTS 6,156,453 A * 12/2000 Shimizu ................ H01M 4/623
 429/212
2004/0042954 A1 3/2004 Park et al.
 (Continued)

FOREIGN PATENT DOCUMENTS

EP 0 834 470 A2 4/1998
JP 2005-505487 A 2/2005
 (Continued)

OTHER PUBLICATIONS

Liumin Suo, et al., "Water-in-salt electrolyte enables high-voltage aqueous lithium-ion chemistries", Science, Nov. 20, 2015, pp. 938-943, vol. 350.

(Continued)

*Primary Examiner* — James M Erwin
(74) *Attorney, Agent, or Firm* — Sughrue Mion, PLLC

(57) ABSTRACT

Decomposition of an aqueous electrolyte solution when an aqueous lithium ion secondary battery is charged and discharged is suppressed, and the operating voltage of the battery is improved. The aqueous lithium ion secondary battery includes an anode, a cathode, and an aqueous electrolyte solution, the anode including a composite of an anode active material and polytetrafluoroethylene, wherein peaks of the polytetrafluoroethylene at around 1150 $cm^{-1}$ and at around 1210 $cm^{-1}$ are observed in FT-IR measurement of the composite, but a peak of the polytetrafluoroethylene at around 729 $cm^{-1}$ is not observed in Raman spectroscopy measurement of the composite.

4 Claims, 10 Drawing Sheets

(51) Int. Cl.
*H01M 10/38* (2006.01)
*H01M 4/66* (2006.01)
*H01M 4/36* (2006.01)
*H01M 4/04* (2006.01)
*H01M 10/36* (2010.01)
*H01M 4/139* (2010.01)
*H01M 4/02* (2006.01)

(52) U.S. Cl.
CPC ........... *H01M 4/366* (2013.01); *H01M 4/587* (2013.01); *H01M 4/663* (2013.01); *H01M 10/36* (2013.01); *H01M 10/38* (2013.01); *H01M 2004/021* (2013.01); *H01M 2004/027* (2013.01); *H01M 2300/0002* (2013.01)

(58) Field of Classification Search
USPC ...................................................... 429/231.8
See application file for complete search history.

(56) References Cited

U.S. PATENT DOCUMENTS

| 2008/0152995 | A1* | 6/2008 | Hwang | ............... H01M 4/62 429/125 |
| 2014/0234732 | A1 | 8/2014 | Park et al. | |
| 2014/0377649 | A1 | 12/2014 | Fukui et al. | |

FOREIGN PATENT DOCUMENTS

| JP | 2007-103298 A | 4/2007 |
| WO | 2013/099558 A1 | 7/2013 |
| WO | 2018/097259 A1 | 5/2018 |

OTHER PUBLICATIONS

Yuki Yamada, et al. "Hydrate-melt electrolytes for high-energy-density aqueous batteries", Nature Energy, Aug. 26, 2016, pp. 1-9.
Liumin Suo, et al., "Advanced High-Voltage Aqueous Lithium-Ion Battery Enabled by "Water-in-Bisalt" Electrolyte", Angew. Chem. Int. Ed., Apr. 27, 2016, pp. 7136-7141, vol. 55.
Chongyin Yang, et al., "4.0 V Aqueous Li-Ion Batteries", Joule, Sep. 6, 2017, pp. 122-132, vol. 1.

* cited by examiner

AQUEOUS LITHIUM ION SECONDARY BATTERY, METHOD FOR PRODUCING ANODE ACTIVE MATERIAL COMPOSITE, AND METHOD FOR PRODUCING AQUEOUS LITHIUM ION SECONDARY BATTERY

INCORPORATION BY REFERENCE

This is a divisional of U.S. application Ser. No. 16/037,555 filed Jul. 17, 2018, which claims priority to Japanese Patent Application No. 2017-179337 filed on Sep. 19, 2017, the disclosure of which, including the specification, drawings and abstract, is incorporated herein by reference in its entirety.

FIELD

The present application discloses an aqueous lithium ion secondary battery etc.

BACKGROUND

A lithium ion secondary battery that contains a flammable nonaqueous electrolyte solution is equipped with a lot of members for safety measures, and as a result, an energy density per volume as a whole of the battery becomes low, which is problematic. In contrast, a lithium ion secondary battery that contains a nonflammable aqueous electrolyte solution does not need safety measures as described above, and thus has various advantages such as a high energy density per volume. However, a conventional aqueous electrolyte solution has a problem of a narrow potential window, which restricts active materials etc. that can be used.

As one means for solving the above described problem that the aqueous electrolyte solution has, Non Patent Literature 1 discloses that dissolving a high concentration of lithium bis(trifluoromethanesulfonyl)imide (hereinafter may be referred to as "LiTFSI") in an aqueous electrolyte solution can expand the range of a potential window of the aqueous electrolyte solution to 1.9-4.9 V (vs. Li/Li+). In Non Patent Literature 1, such an aqueous electrolyte solution of a high concentration, $LiMn_2O_4$ as the cathode active material, and $Mo_6S_8$ as the anode active material are combined, to form an aqueous lithium ion secondary battery.

Non Patent Literature 2 discloses that combining an aqueous electrolyte solution of a high concentration with $C/TiO_2$ to form SEI (Solid Electrolyte Interphase) can result in an expanding potential window of the aqueous electrolyte solution on the reduction side to 1.83 V (vs. Li/Li+).

CITATION LIST

Non Patent Literature

Non Patent Literature 1: Liumin Suo, et al., "Water-in-salt" electrolyte enables high-voltage aqueous lithium-ion chemistries, Science 350, 938 (2015)
Non Patent Literature 2: Yuki Yamada et al., "Hydrate-melt electrolytes for high-energy-density aqueous batteries", NATURE ENERGY (26 Aug. 2016)

SUMMARY

Technical Problem

While the potential window of the aqueous electrolyte solution on the reduction side expands to approximately 1.83 V (vs. Li/Li+) as described above, it is difficult to use an anode active material (for example, carbon-based active material) to charge and discharge lithium ions at a potential baser than this. The aqueous lithium ion secondary batteries of Non Patent Literatures 1 and 2 still have restrictions on active materials etc. that can be used, and have a low voltage (operating voltage), which is problematic.

Solution to Problem

The present application discloses an aqueous lithium ion secondary battery including an anode, a cathode, and an aqueous electrolyte solution, the anode comprising a composite of an anode active material and polytetrafluoroethylene, wherein peaks of the polytetrafluoroethylene at around 1150 $cm^{-1}$ and at around 1210 $cm^{-1}$ are observed in FT-IR measurement of the composite, but a peak of the polytetrafluoroethylene at around 729 $cm^{-1}$ is not observed in Raman spectroscopy measurement of the composite, as one means for solving the above described problem.

In the aqueous lithium ion secondary battery of this disclosure, the anode active material is preferably a carbon-based active material.

In the aqueous lithium ion secondary battery of this disclosure, the anode active material preferably has a particulate shape of 10 nm to 20 μm in particle size.

Preferably, in the aqueous lithium ion secondary battery of this disclosure, the composite contains 10 mass % to 80 mass % of the anode active material, and 20 mass % to 90 mass % of the polytetrafluoroethylene.

Preferably, in the aqueous lithium ion secondary battery of this dislcosure, the anode has an anode current collector, and a surface of the anode current collector is coated with a layer containing the anode active material.

In the aqueous lithium ion secondary battery of this disclosure, the anode current collector is preferably a sheet of graphite.

In the aqueous lithium ion secondary battery of this disclosure, no less than 21 mol of an electrolyte is preferably dissolved per kilogram of water in the aqueous electrolyte solution.

In the aqueous lithium ion secondary battery of this disclosure, the electrolyte preferably contains at least one selected from lithium bis(trifluoromethanesulfonyl)imide, and lithium bis(fluorosulfonyl)imide.

The present application discloses a method for producing an anode active material composite, the method comprising: mixing an anode active material and polytetrafluoroethylene, to obtain a mixture; and heating the mixture at a temperature of no less than a glass transition temperature and lower than a vaporization temperature of the polytetrafluoroethylene, to obtain a composite of the anode active material and the polytetrafluoroethylene, as one means for solving the above described problem.

In the method for producing an anode active material composite of this disclosure, the anode active material is preferably a carbon-based active material.

The present application discloses a method for producing an aqueous lithium ion secondary battery, the method comprising: producing an anode active material composite by the producing method of this disclosure as described above; producing an anode using the anode active material composite; producing a cathode; producing an aqueous electrolyte solution; and storing the anode, the cathode, and the aqueous electrolyte solution in a battery case, as one means for solving the above described problem.

Preferably, the method for producing an aqueous lithium ion secondary battery of this disclosure further comprises: after said storing the anode, the cathode, and the aqueous electrolyte solution in the battery case, to configure the battery, performing charge and discharge at potentials higher than that at which the aqueous electrolyte solution decomposes to generate hydrogen and at which an electrolyte contained in the aqueous electrolyte solution decomposes to form SEI.

In the method for producing an aqueous lithium ion secondary battery of this disclosure, the charge and the discharge are preferably performed at potentials of 1.244 V (vs. Li/Li+) to 3.244 V (vs. Li/Li+).

Advantageous Effects

Composites of the anode active material and polytetrafluoroethylene (hereinafter may be referred to as "PTFE") are used in the aqueous lithium ion secondary battery of this disclosure. Each composite is not just a mixture of the anode active material and PTFE. It is believed that the designated peaks of PTFE are observed in both FT-IR measurement and Raman spectroscopy measurement of a mere mixture of the anode active material and PTFE because there are cases where the anode active material and PTFE are separated, and where PTFE individually flocculates etc. in such a mere mixture. In contrast, while the designated peaks of PTFE are observed in FT-IR measurement of the composites used in the aqueous lithium ion secondary battery of this disclosure, no designated peak of PTFE is observed in Raman spectroscopy measurement of the composites. The composites in such a state can lead to a low electron conductivity over a surface of the anode active material owing to PTFE while securing lithium ion-inserting and extracting properties of the anode active material, and lithium ion conductivity over the surface of the anode active material. Such an effect that repellency of PTFE keeps water molecules in the aqueous electrolyte solution away can be also expected. As described above, when PTFE having a low electron conductivity, and repellency is arranged over a surface of the anode active material, to configure an aqueous lithium ion secondary battery, water molecules can be kept away from the anode active material while lithium ions are properly inserted in and extracted from the anode active material when the battery is charged and discharged, and electron-giving and receiving between the anode active material and the aqueous electrolyte solution can be suppressed, which makes it possible to suppress reductive decomposition of the aqueous electrolyte solution. As a result, an apparent potential window of the aqueous electrolyte solution on the reduction side in the aqueous lithium ion secondary battery expands, an anode active material whose charge-discharge potential of lithium ions is baser, such as a carbon-based active material, can be employed, and the operating voltage of the battery can be improved.

DETAILED DESCRIPTION OF EMBODIMENTS

1. Aqueous Lithium Ion Secondary Battery

Figure 1:
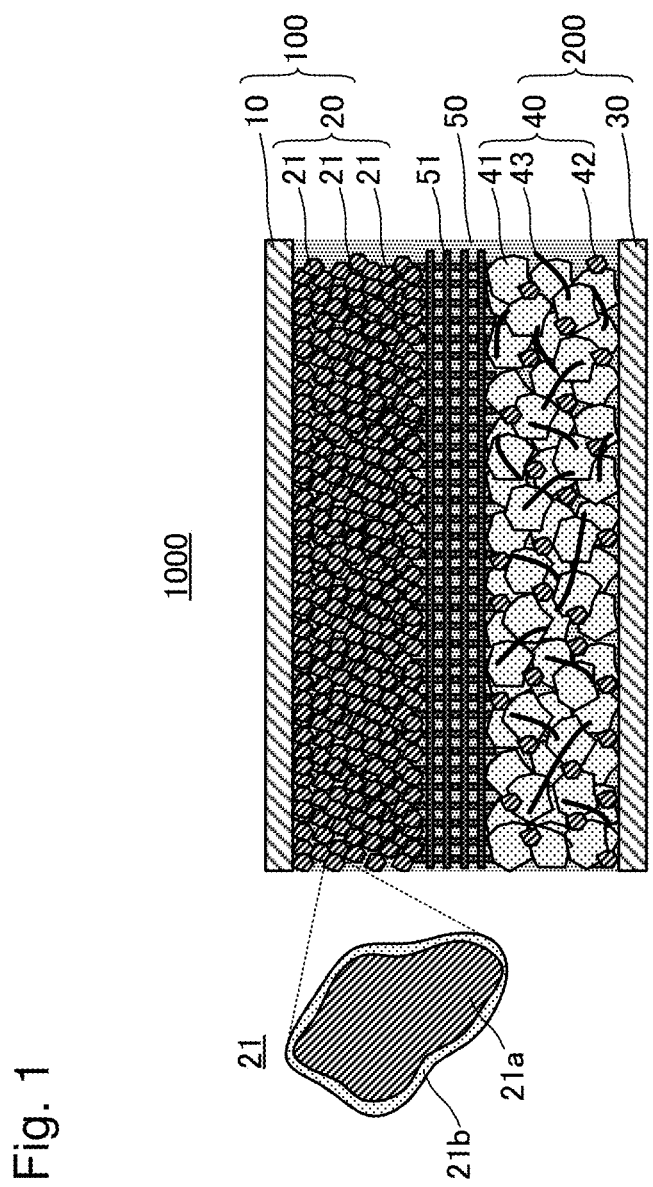
FIG. 1 is an explanatory view of structure of an aqueous lithium ion secondary battery 1000.

FIG. 1 schematically shows the structure of an aqueous lithium ion secondary battery 1000. The aqueous lithium ion secondary battery 1000 includes an anode 100, a cathode 200, and an aqueous electrolyte solution 50. The anode 100 has composites 21 of an anode active material 21a and polytetrafluoroethylene 21b. While the peaks of polytetrafluoroethylene at around 1150 $cm^{-1}$ and 1210 $cm^{-1}$ are observed in FT-IR measurement of the composites 21, the peak of polytetrafluoroethylene at around 729 $cm^{-1}$ is not observed in Raman spectroscopy measurement thereof 1.1. Anode The anode 100 has the composites 21 of the anode active material 21a and the polytetrafluoroethylene 21b. In more detail, the anode 100 has an anode current collector 10, and an anode active material layer 20, and the anode active material layer 20 has the composites 21 as active material.

1.1.1. Anode Current Collector

In the aqueous lithium ion secondary battery 1000, the anode active material layer 20 can secure its conductivity to a certain degree because an active material of a high conductivity (for example, carbon-based active material) can be used as the anode active material 21a. Therefore, in the aqueous lithium ion secondary battery 1000, the anode current collector 10 is optional. In view of improving the performance of the battery more, preferably, the anode 100 has the anode current collector 10, and a surface of the anode current collector 10 is coated with the layer 20 that includes the anode active material 21a (layer 20 that includes the composites 21). In this case, all the surface of the anode current collector 10 does not have to be coated with the anode active material layer 20. A necessary portion of the surface of the anode current collector 10 only may be coated with the anode active material layer 20.

A known conductive material that can be used as an anode current collector of an aqueous lithium ion secondary battery can be used as the anode current collector 10. Examples thereof include metallic material containing at least one element selected from the group consisting of Cu, Ni, Al, V, Au, Pt, Mg, Fe, Ti, Co, Cr, Zn, Ge, and In. Or, the current collector may be formed of carbon material. According to the new findings of the inventors of the present application, a current collector formed of carbon material is preferable to that formed of metallic material, and that formed of a sheet of graphite is more preferable. This is because activity of carbon material is low compared to metallic material, and thus carbon material can further suppress reductive decomposition of the aqueous electrolyte solution 50. The form of the anode current collector 10 is not specifically restricted, and can be any form such as foil, mesh, and a porous form.

1.1.2. Anode Active Material Layer

The anode active material layer 20 touches the anode current collector 10. Especially, as described above, the surface of the anode current collector 10 is preferably coated with the layer 20 that includes the anode active material 21a (layer 20 that includes the composites 21). Because the anode active material layer 20 necessarily includes the polytetrafluoroethylene 21b (PTFE 21b), the PTFE 21b is naturally arranged over the surface of the anode current collector 10 when the surface of the anode current collector 10 is coated with the anode active material layer 20. Whereby, giving and receiving electrons between the anode current collector 10 and the aqueous electrolyte solution 50 are suppressed, and reductive decomposition of the aqueous electrolyte solution 50 can be further suppressed.

The anode active material layer 20 includes the composites 21 as active material. Each composite 21 is formed of the anode active material 21a and the PTFE 21b. While FIG. 1 shows the form of coating all the surface of the anode active material 21a with the PTFE 21b, the form of the composite 21 is not restricted to this.

The anode active material 21a may be selected in view of the potential window of the aqueous electrolyte solution 50. Examples thereof include carbon-based active materials; lithium-transition metal complex oxides; titanium oxide; metallic sulfides such as $Mo_6S_8$; elemental sulfur; $LiTi_2(PO_4)_3$; and NASICON. Specifically, a carbon-based active material or a lithium-transition metal complex oxide is preferably contained, a carbon-based active material or lithium titanate is more preferably contained, and a carbon-based active material is especially preferably contained. Specific examples of a carbon-based active material include artificial graphite, natural graphite, graphite filament, and amorphous carbon. On the other hand, containing $Li_4Ti_5O_{12}$ (LTO) as lithium titanate is also preferable because good SEI tends to be formed. Charge and discharge of a carbon-based active material or LTO in the aqueous solution, which is conventionally difficult, can be stably carried out in the aqueous lithium ion secondary battery 1000.

The shape of the anode active material 21a is not specifically restricted. The shape is not restricted to a particulate shape as shown in FIG. 1, and for example, may be a sheet. In view of improving lithium ion-inserting and extracting properties owing to a large specific surface area, a particulate shape is preferable. When a carbon-based active material is used as the anode active material 21a, for example, acetylene black is preferable as a particulate carbon-based active material. When the anode active material 21a has a particulate shape, the particle size thereof is preferably 1 nm to 100 μm. The lower limit thereof is more preferably no less than 5 nm, further preferably no less than 10 nm, and especially preferably no less than 20 nm; and the upper limit thereof is more preferably no more than 50 μm, further preferably no more than 20 μm, and especially preferably no more than 10 μm. The particle size of the anode active material 21a within this range makes it possible to more properly cover the surface of the anode active material 21a with the polytetrafluoroethylene 21b, and further, makes lithium ion-inserting and extracting properties of the anode active material 21a good, to obtain high power as a battery.

In the present application, just "particle size of the anode active material" means the primary particle size of the anode active material. Primary particles of the anode active material one another may assemble to form a secondary particle. In this case, the secondary particle size is not specifically restricted, but is usually 0.5 μm to 100 μm. The lower limit thereof is preferably no less than 1 μm, and the upper limit thereof is preferably no more than 20 μm.

The polytetrafluoroethylene 21b (PTFE 21b) exists over the surface of the anode active material 21a, being composited with the anode active material 21a. The PTFE 21b suppresses giving and receiving electrons between the anode active material 21a and the aqueous electrolyte solution 50. Such an effect that repellency of the PTFE 21b keeps water molecules in the aqueous electrolyte solution 50 away from the surface of the anode active material 21a can be also expected. Whereby, decomposition of the aqueous electrolyte solution 50 is suppressed when the battery is charged and discharged. The forms of the anode active material 21a and the PTFE 21b in the composite 21 may be forms that satisfy the above described requirements according to FT-IR measurement and Raman spectroscopy measurement. Especially, as far as the inventors of the present application confirmed, the surface of the anode active material 21a is preferably coated with the PTFE 21b continuously in the composite 21 in such a manner that the PTFE 21b is along the shape of the surface as shown in FIG. 1. In other words, the form of coating the surface of the anode active material 21a with the filmy PTFE 21b, or the form of depositing the PTFE 21b over the surface of the anode active material 21a in layers is preferable for the composite 21. All the surface of the anode active material 21a does not have to be coated with the PTFE 21b. Even if coating is partially discontinuous, a certain effect can be secured. The form of the composite 21 in the aqueous lithium ion secondary battery 1000 of the present disclosure is apparently different from "form of just mixing the anode active material, and PTFE as the binder".

The contents of the anode active material 21a and the PTFE 21b in the composite 21 may be such that the contents satisfy the above described requirements of Raman spectroscopy measurement and FT-IR measurement. For example, the composite 21 preferably contains 10 mass % to 80 mass % of the anode active material 21a, and 20 mass % to 90 mass % of the PTFE 21b. A too high content of the PTFE 21b in the composite 21 might not satisfy the above described requirements of Raman spectroscopy measurement, and might lead to too high insulating properties as the anode active material composite 21, which leads to difficulty in charge and discharge reaction. In contrast, a too low content of the PTFE 21b might not satisfy the above described requirements of FT-IR measurement, and might make it impossible to sufficiently suppress electron-giving and receiving between the anode active material 21a and the aqueous electrolyte solution 50, which leads to decomposition of the aqueous electrolyte solution 50 when the battery is charged and discharged. As described above, it can be said that the state and the amount of the PTFE 21b over the surface of the anode active material 21a are indirectly identified in the composite 21 that satisfies the above described requirements of both Raman spectroscopy measurement and FT-IR measurement.

The anode active material layer 20 may contain active material other than the composites 21 as active material, in addition to the composites 21. Examples thereof include material whose charge-discharge potential of lithium ions is baser than that of a cathode active material described later, such as lithium-transition metal complex oxides; titanium oxide; metallic sulfides such as $Mo_6S_8$; elemental sulfur; $LiTi_2(PO_4)_3$; and NASICON. In view of further improving the operating voltage of the battery, and further improving the performance of the battery, the proportion of the composites 21 in the active material is preferably as much as possible. Preferably, no less than 90 mass % of the active material contained in the anode active material layer 20 is the composites 21. Especially preferably, the active material contained in the anode active material layer 20 consists of the composites 21.

When, for example, a carbon-based active material is used as the anode active material 21a, any conductive additive or binder is not necessary in the anode active material layer 20 because conductivity can be secured by the anode active material 21a that forms the composites 21. This is also because the PTFE 21b that forms the composites 21 can also function as the binder. In this point, the anode active material layer 20 may consist of the composites 21 only. A known conductive additive and binder may be contained in the anode active material layer 20 if necessary. The conductive additive and the binder may be properly selected from specific examples thereof for a cathode active material layer 40 described later. The amounts of the conductive additive and the binder in the anode active material layer 20 may be properly determined as well.

The thickness of the anode active material layer is not specifically restricted, but, for example, is preferably 0.1 μm to 1 mm, and more preferably 1 μm to 100 μm.

1.1.3. Additional Notes

According to the findings of the inventors of the present application, a certain effect is obtained if poly(vinylidene fluoride) (PVdF) is employed instead of PTFE in the composite 21. That is, according to the findings of the inventors, it is believed that in the composite 21, the anode active material 21a and "fluororesin" have only to be composited. However, according to the findings of the inventors, when PTFE is employed among many fluororesins, to form the composite 21, an apparent potential window of the aqueous electrolyte solution 50 on the reduction side largely expands to 0.3 V (vs. Li/Li+), and a higher operating voltage can be secured.

It is known that PTFE reduces to decompose at approximately 0.7 V (vs. Li/Li+) (Journal of Power Sources 68(1997) 344-347 etc.). Here, it is also believed that a carbon-based active material among the examples of the anode active material 21a inserts and extracts lithium ions at a voltage lower than 0.7 V (vs. Li/Li+), which leads to reductive decomposition of PTFE. In this point, it is to violate common general technical knowledge for the person skilled in the art to use PTFE along with a carbon-based active material in the anode. However, according to the findings of the inventors of the present application, when the composites 21 of a carbon-based active material and the PTFE 21b are used in the aqueous lithium ion secondary battery 1000, a sufficient amount of the PTFE 21b still remains over the surface of the carbon-based active material although part of the PTFE 21b decomposes when the battery is charged and discharged, and the desired effect can be continuously brought about. In this point, it can be said that structure that cannot be thought out of conventional common knowledge (combining a carbon-based active material and PTFE in the anode) can be employed in the aqueous lithium ion secondary battery 1000 of this disclosure, whereby a pronounced effect unpredictable by the person skilled in the art can be brought about.

1.2. Cathode

The cathode 200 includes a cathode current collector 30, and a cathode active material layer 40 including a cathode active material 41 and touching the cathode current collector 30.

1.2.1. Cathode Current Collector

A known metal that can be used as a cathode current collector of an aqueous lithium ion secondary battery can be used as the cathode current collector 30. Examples thereof include metallic material containing at least one element selected from the group consisting of Cu, Ni, Al, V, Au, Pt, Mg, Fe, Ti, Co, Cr, Zn, Ge, and In. Alternatively, the current collector may be formed of carbon material as described above. The form of the cathode current collector 30 is not specifically restricted, and can be any form such as foil, mesh, and a porous form.

1.2.2. Cathode Active Material Layer

The cathode active material layer 40 includes the cathode active material 41. The cathode active material layer 40 may include a conductive additive 42, and a binder 43, in addition to the cathode active material 41.

Any cathode active material for an aqueous lithium ion secondary battery can be employed as the cathode active material 41. Needless to say, the cathode active material 41 has a potential nobler than that of the above described anode active material 21a, and is properly selected in view of the potential window of the aqueous electrolyte solution 50 which will be described later. For example, a cathode active material containing a Li element is preferable. Specifically, an oxide, a polyanion, or the like containing a Li element is preferable, which is more specifically lithium cobaltate ($LiCoO_2$); lithium nickelate ($LiNiO_2$); lithium manganate ($LiMn_2O_4$); $LiNi_{1/3}Mn_{1/3}Co_{1/3}O_2$; a different kind element substituent Li—Mn spinel represented by $Li_{1+x}Mn_{2-x-y}M_yO_4$ (M is at least one selected from Al, Mg, Co, Fe, Ni, and Zn); lithium titanate that shows a nobler charge-discharge potential compared with that of the anode active material ($Li_xTiO_y$); a lithium metal phosphate ($LiMPO_4$, M is at least one selected from Fe, Mn, Co, and Ni); or the like. Or, lithium titanate ($Li_xTiO_y$), $TiO_2$, $LiTi_2(PO_4)_3$, sulfur (S), or the like which shows a nobler charge-discharge potential compared to the above described anode active material 21a can be used as well. Since the oxidation potential of the potential window of the aqueous electrolyte solution 50 can be approximately no less than 5.0 V (vs. Li/Li+), a cathode active material of a high potential which contains a Mn element etc. in addition to a Li element can be also used. In view of surely suppressing decomposition of the aqueous electrolyte solution 50, a cathode active material selected from $LiFePO_4$, $LiMaO_2$ (Ma is at least one selected from Co, Ni, Mn, and Fe), and $LiMb_2O_4$ (Mb is at least one selected from Co, Ni, Mn, and V), whose charge-discharge potentials of lithium ions are no more than 4.27 V, is preferably used. One cathode active material may be used individually, or two or more cathode active materials may be mixed to be used as the cathode active material 41. The shape of the cathode active material 41 is not specifically restricted. A preferred example thereof is a particulate shape. When the cathode active material 41 has a particulate shape, the primary particle size thereof is preferably 1 nm to 100 μm. The lower limit thereof is more preferably no less than 5 nm, further preferably no less than 10 nm, and especially preferably no less than 50 nm; and the upper limit thereof is more preferably no more than 30 μm, and further preferably no more than 10 μm. Primary particles of the cathode active material 41 one another may assemble to form a secondary particle. In this case, the secondary particle size is not specifically restricted, but is usually 0.5 μm to 50 μm. The lower limit thereof is preferably no less than 1 μm, and the upper limit thereof is preferably no more than 20 The primary and secondary particle sizes of the cathode active material 41 within these ranges make it possible to obtain the cathode active material layer 40 further superior in ion conductivity and electron conductivity.

The amount of the cathode active material 41 included in the cathode active material layer 40 is not specifically restricted. For example, on the basis of the whole of the cathode active material layer 40 (100 mass %), the content of the cathode active material 41 is preferably no less than 20 mass %, more preferably no less than 40 mass %, further preferably no less than 60 mass %, and especially preferably no less than 70 mass %. The upper limit is not specifically restricted, but is preferably no more than 99 mass %, more preferably no more than 97 mass %, and further preferably no more than 95 mass %. The content of the cathode active material 41 within this range makes it possible to obtain the cathode active material layer 40 further superior in ion conductivity and electron conductivity.

The cathode active material layer 40 preferably includes the conductive additive 42, and the binder 43, in addition to the cathode active material 41.

Any conductive additive used in an aqueous lithium ion secondary battery can be employed as the conductive additive 42. Specifically, a conductive additive containing a carbon material selected from Ketjen black (KB), vapor grown carbon fiber (VGCF), acetylene black (AB), carbon nanotubes (CNT), and carbon nanofiber (CNF) is preferable. Or, metallic material that can bear an environment where the battery is to be used may be used. One conductive additive may be used individually, or two or more conductive additives may be mixed to be used as the conductive additive 42. The amount of the conductive additive 42 included in the cathode active material layer 40 is not specifically restricted. For example, the content of the conductive additive 42 is preferably no less than 0.1 mass %, more preferably no less than 0.5 mass %, and further preferably no less than 1 mass %, on the basis of the whole of the cathode active material layer 40 (100 mass %). The upper limit is not specifically restricted, but preferably no more than 50 mass %, more preferably no more than 30 mass %, and further preferably no more than 10 mass %. The content of the conductive additive 42 within this range makes it possible to obtain the cathode active material layer 40 further superior in ion conductivity and electron conductivity.

Any binder used in an aqueous lithium ion secondary battery can be employed as the binder 43. Examples thereof include styrene-butadiene rubber (SBR), carboxymethyl cellulose (CMC), acrylonitrile-butadiene rubber (ABR), butadiene rubber (BR), polyvinylidene fluoride (PVDF), and polytetrafluoroethylene (PTFE). One binder may be used individually, or two or more binders may be mixed to be used as the binder 43. The amount of the binder 43 included in the cathode active material layer 40 is not specifically restricted. For example, the content of the binder 43 is preferably no less than 0.1 mass %, more preferably no less than 0.5 mass %, and further preferably no less than 1 mass %, on the basis of the whole of the cathode active material layer 40 (100 mass %). The upper limit is not specifically restricted, but is preferably no more than 50 mass %, more preferably no more than 30 mass %, and further preferably no more than 10 mass %. The content of the binder 43 within this range makes it possible to properly bind the cathode active material 41 etc., and to obtain the cathode active material layer 40 further superior in ion conductivity and electron conductivity.

The thickness of the cathode active material layer 40 is not specifically restricted, but, for example, is preferably 0.1 µm to 1 mm, and more preferably 1 µm to 100 µm.

1.3. Aqueous Electrolyte Solution

The aqueous electrolyte solution 50 contains solvent containing water, and an electrolyte dissolved in the solvent.

1.3.1. Solvent

The solvent contains water as the main component. That is, no less than 50 mol %, preferably no less than 70 mol %, and more preferably no less than 90 mol % of the solvent that forms the electrolyte solution (liquid components) is water on the basis of the total amount of the solvent (100 mol %). In contrast, the upper limit of the proportion of water in the solvent is not specifically restricted.

While containing water as the main component, the solvent may further contain solvent other than water in view of, for example, forming SEI over a surface of the active material. Examples of a solvent except water include at least one nonaqueous solvent selected from ethers, carbonates, nitriles, alcohols, ketones, amines, amides, sulfur compounds, and hydrocarbons. Preferably no more than 50 mol %, more preferably no more than 30 mol %, and further preferably no more than 10 mol % of the solvent that forms the electrolyte solution (liquid components) is the solvent other than water on the basis of the total amount of the solvent (100 mol %).

1.3.2. Electrolyte

The aqueous electrolyte solution 50 preferably contains no less than 1 mol of an electrolyte per kilogram of the above described water. The content thereof is more preferably no less than 5 mol, further preferably no less than 10 mol, and especially preferably no less than 21 mol. The upper limit is not specifically restricted, and for example, is preferably no more than 25 mol. As the concentration of the electrolyte is high in the aqueous electrolyte solution 50, the potential window of the aqueous electrolyte solution 50 on the reduction side tends to expand.

When a high concentration of the electrolyte is contained in the aqueous electrolyte solution 50, the electrolyte preferably contains at least one selected from lithium bis(trifluoromethanesulfonyl)imide (LiTFSI), and lithium bis(fluorosulfonyl)imide (LiFSI). Specifically, the electrolyte more preferably contains LiTFSI and/or LiFSI as the main component(s). That is, preferably no less than 50 mol %, more preferably no less than 70 mol %, and further preferably no less than 90 mol % of the electrolyte contained (dissolving) in the electrolyte solution is LiTFSI and LiFSI in total on the basis of the total amount of the electrolyte (100 mol %). LiTFSI and LiFSI have high solubility in water, which makes it possible to easily make an aqueous electrolyte solution of a high concentration. Specifically, LiTFSI is preferable.

The aqueous electrolyte solution 50 may further contain (an) electrolyte(s) other than LiTFSI or LiFSI. For example, $LiPF_6$, $LiBF_4$, $Li_2SO_4$, $LiNO_3$, etc. may be contained. The electrolyte(s) other than LiTFSI or LiFSI is/are preferably no more than 50 mol %, more preferably no more than 30 mol %, and further preferably no more than 10 mol % of the electrolyte contained (dissolving) in the electrolyte solution on the basis of total amount of the electrolyte (100 mol %).

1.3.3. Optional Components

The aqueous electrolyte solution 50 may contain (an)other component(s) in addition to the above described solvent and electrolyte. For example, alkali metals other than lithium, alkaline earth metals, etc. as cations can be added as the other components. Further, lithium hydroxide etc. may be contained for adjusting pH of the aqueous electrolyte solution 50.

pH of the aqueous electrolyte solution 50 is not specifically restricted. There are general tendencies for a potential window on the oxidation side to expand as pH of an aqueous electrolyte solution is low, while for that on the reduction side to expand as pH thereof is high. Here, according to the new findings of the inventors of the present application, as the concentration of LiTFSI in the aqueous electrolyte solution 50 is high, pH of the aqueous electrolyte solution 50 is low. Nevertheless, according to the new findings of the inventors, the potential window on the reduction side can be sufficiently expanded even if a high concentration of LiTFSI is contained in the aqueous electrolyte solution 50. For example, even if pH of the aqueous electrolyte solution 50 is as low as 3, the potential window on the reduction side can be sufficiently expanded. The upper limit of pH is not specifically restricted, but in view of keeping the potential window on the oxidation side high, pH is preferably no more than 11. In summary, pH of the aqueous electrolyte solution 50 is preferably 3 to 11. The lower limit of pH is more preferably no less than 6, and the upper limit thereof is more preferably no more than 8.

1.3.4. Separator

An electrolyte solution exists inside an anode active material layer, inside a cathode active material layer, and between the anode and cathode active material layers in a lithium ion secondary battery of the electrolyte solution system, which secures lithium ion conductivity between the anode and cathode active material layers. This manner is also employed as the battery 1000. Specifically, in the battery 1000, a separator 51 is provided between the anode active material layer 20 and the cathode active material layer 40. The separator 51, the anode active material layer 20, and the cathode active material layer 40 are immersed in the aqueous electrolyte solution 50. The aqueous electrolyte solution 50 penetrates inside the anode active material layer 20 and the cathode active material layer 40, and touches the anode current collector 10 and the cathode current collector 30.

A separator used in a conventional aqueous electrolyte solution battery (NiMH, Zn-Air battery, etc.) is preferably employed as the separator 51. For example, a hydrophilic separator such as nonwoven fabric made of cellulose can be preferably used. The thickness of the separator 51 is not specifically restricted. For example, a separator of 5 μm to 1 mm in thickness can be used.

As described above, in the aqueous lithium ion secondary battery 1000, the composites 21 of the anode active material 21a and the PTFE 21b are used as active material in the anode. The composite 21 is not just a mixture of the anode active material 21a and the PTFE 21b. As described above, while the designated peaks of PTFE are observed in FT-IR measurement of the composites 21, no designated peak of PTFE 15 observed in Raman spectroscopy measurement thereof. The composites 21 in such a state can lead to a low electron conductivity over the surface of the anode active material 21a owing to the PTFE 21b while securing lithium ion-inserting and extracting properties of the anode active material 21a, and lithium ion conductivity over the surface of the anode active material 21a. Such an effect that repellency of the PTFE 21b keeps water molecules in the aqueous electrolyte solution away can be also expected. As described above, when the PTFE 21b having a low electron conductivity, and repellency is arranged over the surface of the anode active material 21a, to configure the aqueous lithium ion secondary battery 1000, water molecules can be kept away from the anode active material 21a without lithium ions kept away therefrom when the battery 1000 is charged and discharged, and electron-giving and receiving between the anode active material 21a and the aqueous electrolyte solution 50 can be also suppressed, which makes it possible to suppress reductive decomposition of the aqueous electrolyte solution 50. As a result, an apparent potential window of the aqueous electrolyte solution 50 on the reduction side in the aqueous lithium ion secondary battery 1000 expands, an anode active material whose charge-discharge potential of lithium ions is baser, such as a carbon-based active material, can be employed as the anode active material 21a, and the operating voltage of the battery can be improved.

2. Method for Producing Anode Active Material Composite

Figure 2:
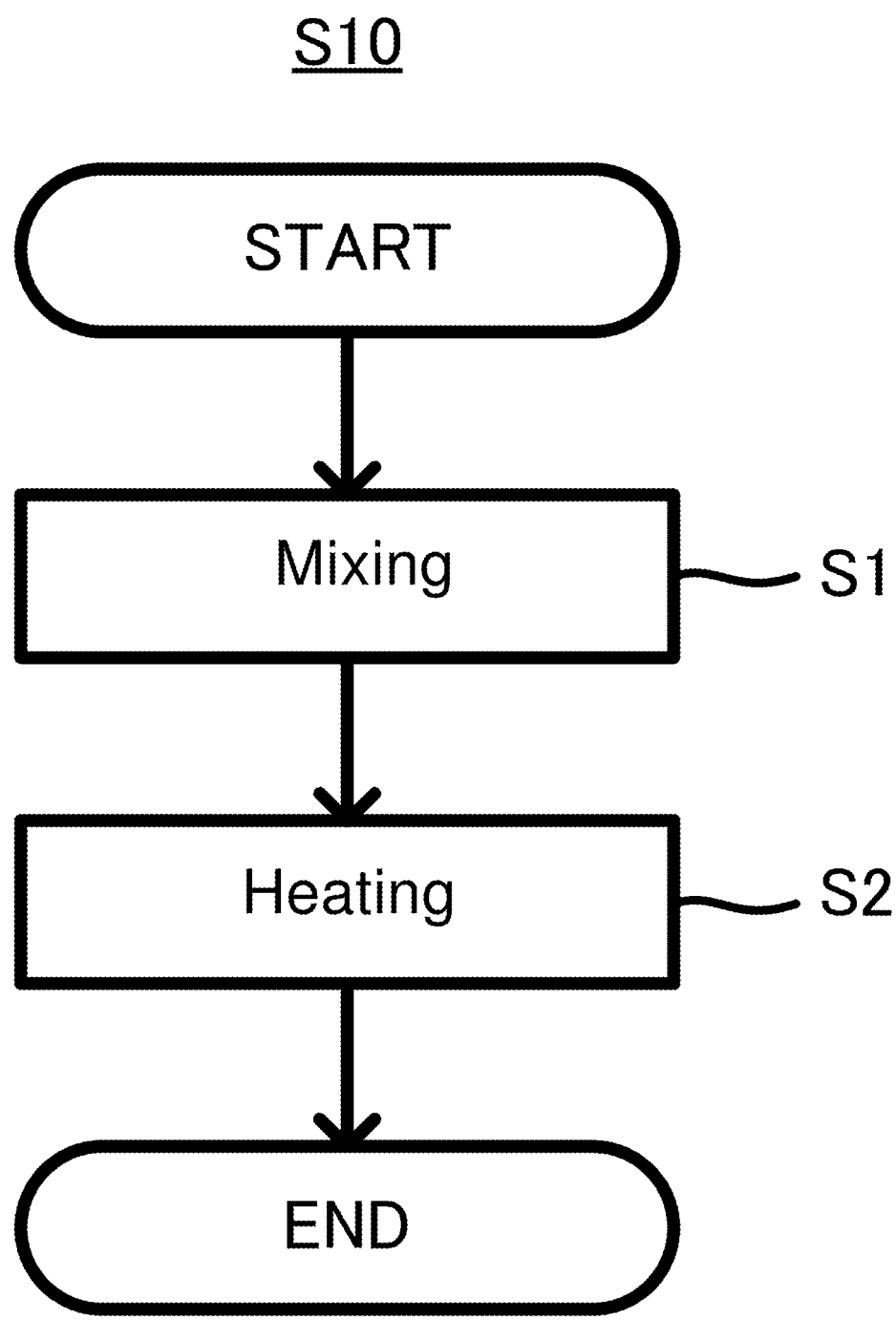
FIG. 2 is an explanatory flowchart of a method for producing an anode active material S10.

FIG. 2 is the flowchart of a method for producing the anode active material composite S10. As shown in FIG. 2, the producing method S10 includes the steps of: mixing the anode active material 21a and the polytetrafluoroethylene 21b, to obtain a mixture 21' S1; and heating the mixture 21' at a temperature of no less than the glass transition temperature and lower than the vaporization temperature of polytetrafluoroethylene, to obtain the composites 21 of the anode active material 21a and the polytetrafluoroethylene 21b S2.

2.1. Mixing Anode Active Material and PTFE

In the step S1, the anode active material 21a and the PTFE 21b are mixed, to be the mixture 21'. For example, the anode active material 21a is added into a dispersion containing the PTFE 21b, to be mixed. If the PTFE 21b is arranged over the surface of the anode active material 21a in the form of a sheet, this also falls under the mixture 21' in the present application. The means for mixing the anode active material 21a and the PTFE 21b is not specifically restricted. They may be either mechanically or manually mixed. When they are mechanically mixed, a known mixing means may be used. Wet mixing using a dispersion as described above or the like may be carried out, or solids each other may be subjected to dry mixing. When wet mixing is carried out, a dispersant is preferably added, to obtain a slurry where the mixture 21' is dispersed. The mixing ratio (mass ratio) of the anode active material 21a and the PTFE 21b in the mixture 21' may be such that the composites 21 that are finally produced by the producing method S10 satisfy the above described requirements of Raman spectroscopy measurement and FT-IR measurement. The preferred mass ratio is as described above.

2.2. Heating Mixture

The anode active material 21a and the PTFE 21b are not only merely mixed, but also thereafter subjected to heat treatment, to obtain the composites 21 of the anode active material 21a and the PTFE 21b. In the step S2, the mixture 21' is heated at a temperature of no less than the glass transition temperature and lower than the vaporization temperature of PTFE. For example, the mixture 21' is preferably heated at a temperature of 327° C. to 390° C. A too high or low heating temperature makes it impossible to properly composite the anode active material 21a with the PTFE 21b, and to give the desired repellency and insulating properties to the surface of the anode active material 21a. A known heating means may be used for the heating. The heating atmosphere is not specifically restricted, and for example, can be an atmospheric atmosphere. The heating time is not specifically restricted as well, and may be a time when the anode active material 21a and the PTFE 21b can be properly composited, that is, such a time that the composites 21 obtained after the heating satisfy the above described requirements according to Raman spectroscopy measurement and FT-IR measurement.

In the step S2, the mixture 21' may be heated together with the anode current collector after the mixture 21' is arranged over the surface of the anode current collector 10. For example, the surface of the anode current collector 10 is coated with the slurry containing the mixture 21', which was obtained by the wet mixing, dried, and thereafter heated. As the coating method, a doctor blade method, electrostatic spray deposition, dip coating, spray coating, or the like can be employed. In this case, in the step S2, the anode active material 21*a* and the PTFE 21*b* are composited over the surface of the anode current collector 10, and at the same time, the composites 21 can be fixed to the surface of the anode current collector 10. As a result, the surface of the anode current collector 10 can be coated with the anode active material layer 20, and the anode 100 can be produced at the same time when the composites 21 are produced.

The composites 21 can be easily produced through the above described steps.

3. Method for Producing Aqueous Lithium Ion Secondary Battery

Figure 3:
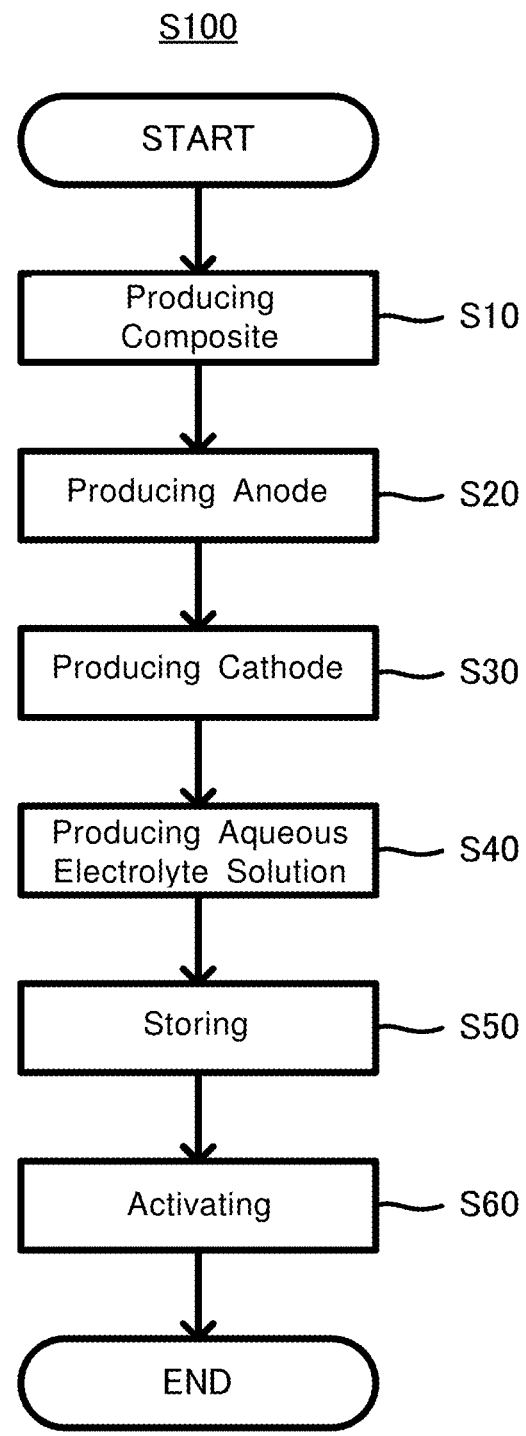
FIG. 3 is an explanatory flowchart of a method for producing an aqueous lithium ion secondary battery S100.

FIG. 3 is the flowchart of a method for producing the aqueous lithium ion secondary battery S100. As shown in FIG. 3, the producing method S100 includes the steps of producing the anode active material composites 21 according to the producing method S10, producing the anode 100 using the anode active material composites 21 S20, producing the cathode 200 S30, producing the aqueous electrolyte solution 50 S40, and storing the produced anode 100, cathode 200, and aqueous electrolyte solution 50 in a battery case S50. As shown in FIG. 3, a step of activating the battery S60 is preferably included after the anode 100, the cathode 200 and the aqueous electrolyte solution 50 are stored in the battery case, to configure the battery. The order of carrying out the steps S20 to S40 is not restricted to that shown in FIG. 3.

3.1. Producing Anode Active Material Composite

The step for producing the anode active material composites 21 is as described above.

3.2. Producing Anode

The anode 100 can be produced by known processes except that the composites 21 are used as active material. As described above, the anode 100 can be produced at the same time when the composites 21 are produced. Of course, the anode may be produced after the composites 21 are produced. In this case, for example, the composites 21 to form the anode active material layer 20 are dispersed in solvent, to obtain an anode paste (slurry). Water and various organic solvents can be used as the solvent used in this case without specific restrictions. The surface of the anode current collector 10 is coated with the anode paste (slurry) using a doctor blade or the like, and thereafter dried, to form the anode active material layer 20 over the surface of the anode current collector 10, to be the anode 100. Or, the composites 21 are dry-molded along with the anode current collector 10, which makes it possible to layer the anode active material layer 20 over the surface of the anode current collector 10 as well. On the other hand, when the anode current collector 10 is not employed, one may mold the composites 21 after producing the composites 21, to make the anode 100 that consists of the anode active material layer 20 only.

3.2. Producing Cathode

The cathode 200 can be produced through known processes. For example, the cathode active material 41 etc. to form the cathode active material layer 40 is dispersed in solvent, to obtain a cathode mixture paste (slurry). Water and various organic solvents can be used as the solvent used in this case without specific restrictions. The surface of the cathode current collector 30 is coated with the cathode mixture paste (slurry) using a doctor blade or the like, and thereafter dried, to form the cathode active material layer 40 over the surface of the cathode current collector 30, to be the cathode 200. Electrostatic spray deposition, dip coating, spray coating, or the like can be employed as well, as the coating method, other than a doctor blade method. Or, the cathode active material 41 etc. are dry-molded along with the cathode current collector 30, which makes it possible to layer the cathode active material layer 40 over the surface of the cathode current collector 30 as well.

3.3. Producing Aqueous Electrolyte Solution

The aqueous electrolyte solution 50 can be produced through known processes as well. For example, one may mix the above described solvent and electrolyte, to dissolve the electrolyte in the solvent.

3.4. Storing in Battery Case

The produced anode 100, cathode 200, and aqueous electrolyte solution 50 are stored in the battery case, to be the aqueous lithium ion secondary battery 1000. For example, the separator 51 is sandwiched between the anode 100 and the cathode 200, to obtain a stack including the anode current collector 10, the anode active material layer 20, the separator 51, the cathode active material layer 40, and the cathode current collector 30 in this order. The stack is equipped with other members such as terminals if necessary. The stack is stored in the battery case, and the battery case is filled with the aqueous electrolyte solution 50. The battery case which the stack is stored in and is filled with the electrolyte solution is sealed up such that the stack is immersed in the aqueous electrolyte solution 50, to be the aqueous lithium ion secondary battery 1000.

3.5. Activating Battery

After the anode 100, the cathode 200, and the aqueous electrolyte solution 50 are stored in the battery case, to configure the battery, charge and discharge are preferably carried out at potentials nobler than that at which the aqueous electrolyte solution 50 decomposes to generate hydrogen (that is, a potential at which hydrogen is not generated) and at which the electrolyte contained in the aqueous electrolyte solution 50 decomposes to form SEI. Whereby, good SEI can be formed over the surfaces of the composites 21, and the performance of the battery is further improved.

"Potential at which the aqueous electrolyte solution 50 decomposes to generate hydrogen", and "potential at which the electrolyte contained in the aqueous electrolyte solution 50 decomposes to form SEI" can be determined according to the type of the electrolyte contained in the aqueous electrolyte solution 50, and the potential window of the aqueous electrolyte solution 50.

In the step S60, for example, the above described charge and discharge are preferably carried out at potentials of 1.244 V (vs. Li/Li+) to 3.244 V (vs. Li/Li+). Potentials of no less than 1.244 V (vs. Li/Li+) make it hard to generate hydrogen due to decomposition of the aqueous electrolyte solution 50. Potentials of no more than 3.244 V (vs. Li/Li+) lead to decomposition of the electrolyte contained in the aqueous electrolyte solution 50, which can lead to proper formation of SEI.

In the step S60, a potential difference between charge and discharge is preferably as large as possible. That is, charge and discharge are preferably carried out at potentials as low as possible and as high as possible respectively. Whereby, SEI is effectively formed over the surfaces of the composites 21. For example, the potential difference is preferably no less than 1 V.

In the step S60, charge and discharge are preferably repeated. For example, the cycle of charge and discharge is preferably repeated 3 to 20 times. According to the findings of the inventors of the present application, repeating the cycle of charge and discharge 3 or more times leads to sufficient formation of films over the surfaces of the composites 21 etc., and so on. In contrast, it just takes a lot of time to repeat the cycle too many times, compared to the effect, which is not efficient.

The aqueous lithium ion secondary battery 1000 that brings about the above described desired effect can be easily produced according to the producing method S100.

EXAMPLES

Example 1

1. Producing Anode

Acetylene black (manufactured by Denka Company Limited) and a PTFE dispersion (AD911E manufactured by Asahi Glass Co., Ltd.) were mixed as the anode active material, so as to have the ratio of the solid content (weight ratio) of 7:3. A dispersant (Triton X-100 manufactured by Nacalai Tesque, Inc.) was further added to the mixture, to prepare a slurry. A surface of a sheet of graphite (manufactured by Toyo Tanso Co., Ltd.), which was an anode current collector, was coated with the obtained slurry. After air-dried, the sheet was heated at 360° C., which was no less than the glass transition temperature and lower than the vaporization temperature of PTFE, whereby an anode active material layer that was formed of composites of acetylene black and PTFE was formed over the surface of the sheet of graphite, to be an anode.

2. Producing Battery

The obtained anode was used as a working electrode, a Ag/AgCl electrode (saturated KCl solution) was used as a reference electrode, spatter coated SUS with Au was used as an auxiliary electrode, and an aqueous electrolyte solution obtained by dissolving 21 mol of LiTFSI per kilogram of water was used as electrolyte solution, to obtain an aqueous lithium ion battery for evaluation.

3. Evaluation of Battery

Figure 4:
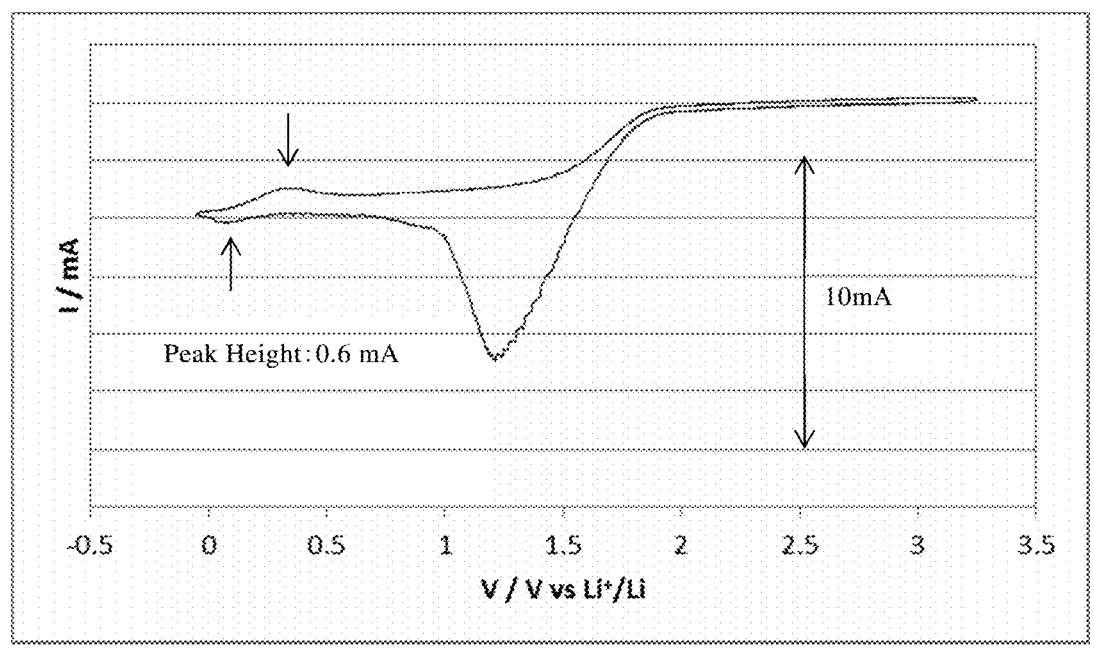
FIG. 4 shows the result of evaluation of a battery according to Example 1.

The working electrode was scanned at 10 mV/s within the range of −3.2 V to 0 V in terms of the Ag/AgCl electrode which was the reference electrode, to confirm the presence or not of the oxidation and reduction peaks. The result of the evaluation is shown in FIG. 4.

Example 2

Figure 5:
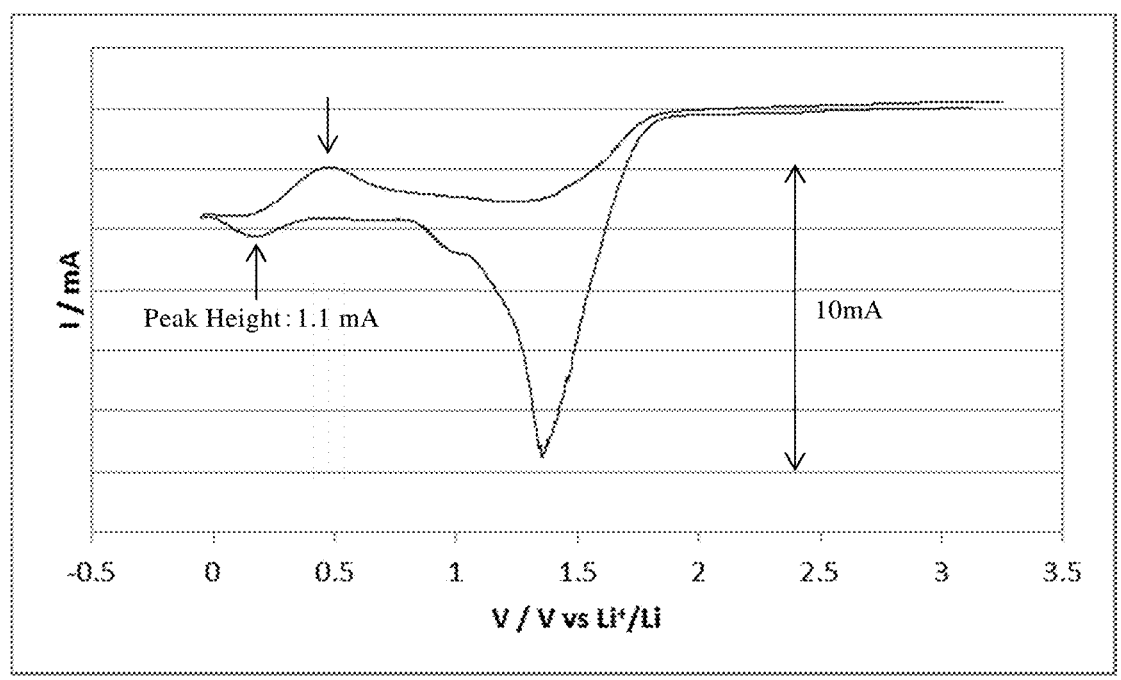
FIG. 5 shows the result of evaluation of a battery according to Example 2.

A battery obtained in the same way as Example 1 was subjected to an activating process. Specifically, after a scan cycle at 10 mV/s between −2 V and 0 V in terms of the reference electrode (between 1.244 V and 3.244 V on the basis of Li/Li+) was repeated 20 times, the battery was evaluated in the same way as Example 1. This activating process was the same as a process of repeating the cycle of charge and discharge between 1.244 V and 3.244 V on the basis of Li/Li+ on a secondary battery 20 times. The result of the evaluation is shown in FIG. 5.

Example 3

Figure 6:
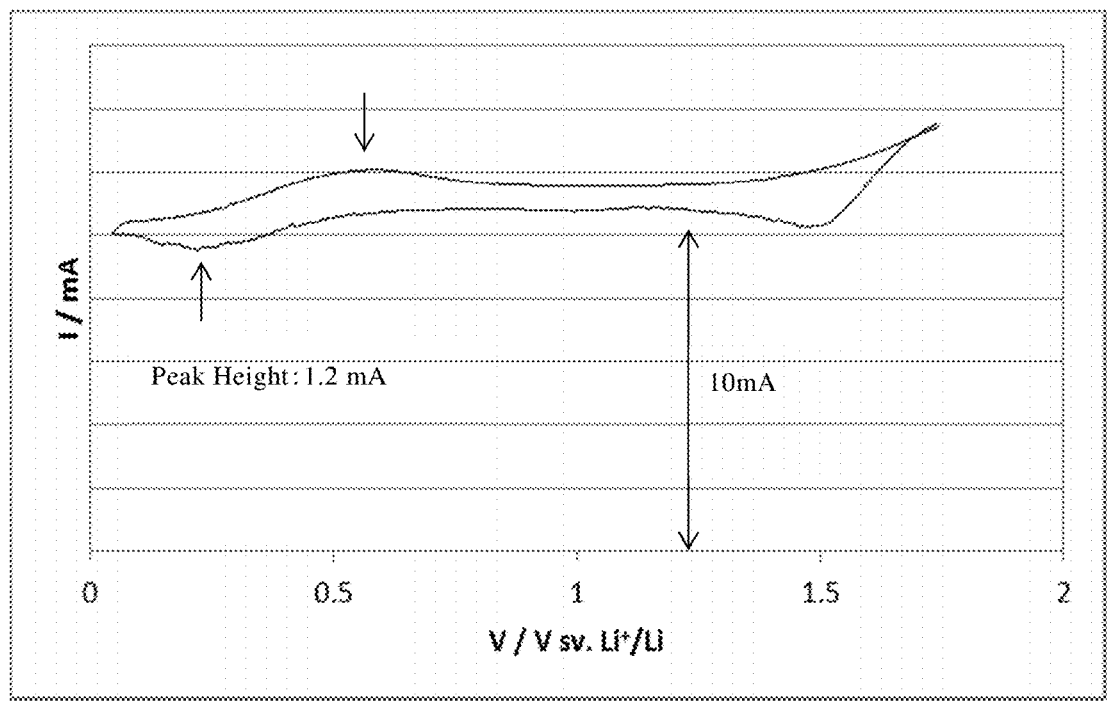
FIG. 6 shows the result of evaluation of a battery according to Example 3.

A battery was made to be evaluated in the same way as Example 2 except that the aqueous electrolyte solution was a saturated solution at 25° C. The result of the evaluation is shown in FIG. 6. It is noted that "saturated solution" was determined to be obtained when a large amount of salt was added to water, stirred and dissolved, and the amount of added salt was the same as that of depositing salt.

Comparative Example 1

Figure 7:
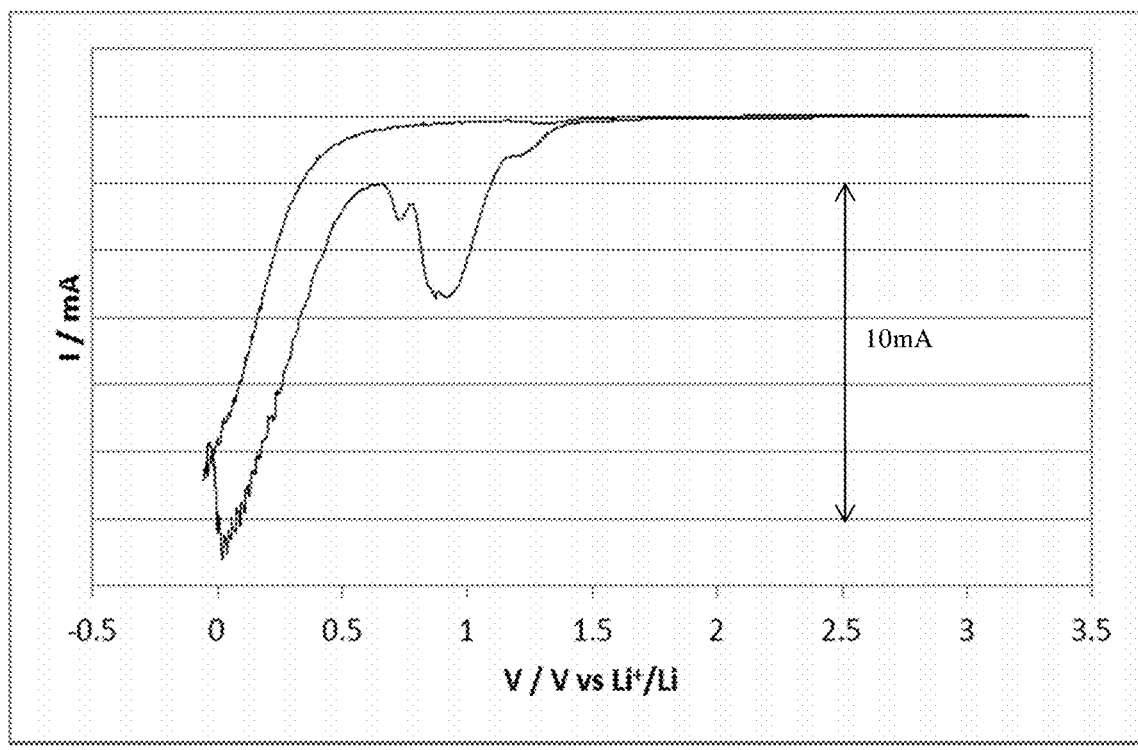
FIG. 7 shows the result of evaluation of a battery according to Comparative Example 1.

A battery was made to be evaluated in the same way as Example 1 except that a sheet of graphite was used as the anode. The result of the evaluation is shown in FIG. 7.

Comparative Example 2

Figure 8:
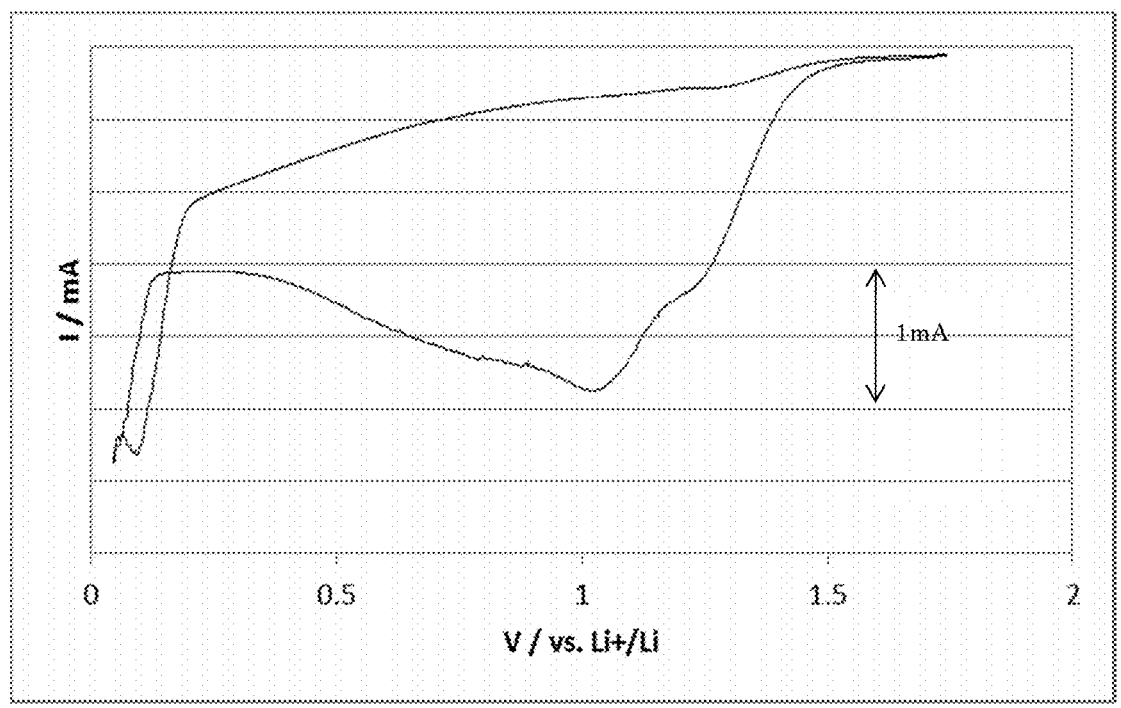
FIG. 8 shows the result of evaluation of a battery according to Comparative Example 2.

A battery was made to be evaluated in the same way as Example 1 except that a carboxymethyl cellulose (CMC) dispersion (manufactured by Wako Pure Chemical Industries, Ltd.) was used instead of the PTFE dispersion. The result of the evaluation is shown in FIG. 8.

4. Results of Evaluation

As shown in FIG. 4, the oxidation and reduction peaks were observed at approximately −0.3 V (vs. Li/Li+), and a reversible change was able to be confirmed in the battery of Example 1. That is, it was found that in the aqueous lithium ion secondary battery, the carbon-based active material was able to function as the anode active material while decomposition of the aqueous electrolyte solution was suppressed.

As shown in FIG. 5, in the battery of Example 2, the oxidation and reduction currents were larger than the battery of Example 1. Good SEI was believed to be formed over a surface of the anode by the activating process.

Further, as shown in FIG. 6, the oxidation and reduction peaks were observed at approximately −0.3 V (vs. Li/Li+), and a reversible change was able to be confirmed in the battery of Example 3, where the saturated solution was used as the electrolyte, as well.

On the other hand, as shown in FIG. 7, while the reduction peak appeared, no oxidation peak was observed, and a reversible change was not able to be confirmed in the battery of Comparative Example 1.

As shown in FIG. 8, while the reduction peak appeared, no oxidation peak was observed, and a reversible change was not able to be confirmed in the battery of Comparative Example 2 as well.

5. Analysis of Composite

The composites of the anode active material and PTFE obtained in Example 1 were subjected to FT-IR measurement and Raman spectroscopy measurement. The result of the FT-IR measurement is shown in FIG. 9, and that of the Raman spectroscopy measurement is shown in FIG. 10.

Figure 9:
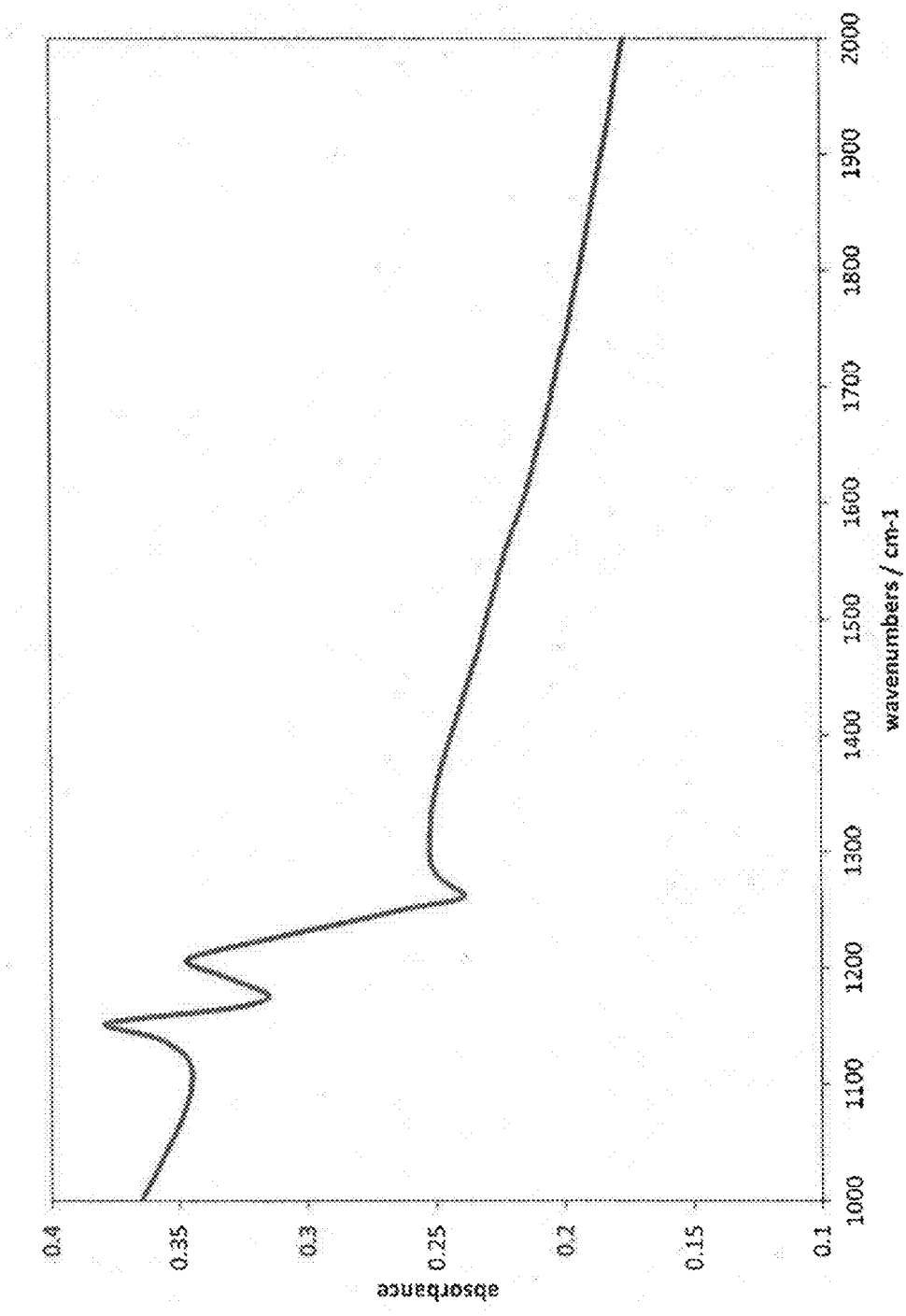
FIG. 9 shows the result of FT-IR measurement of composites used in Example 1.
Figure 10:
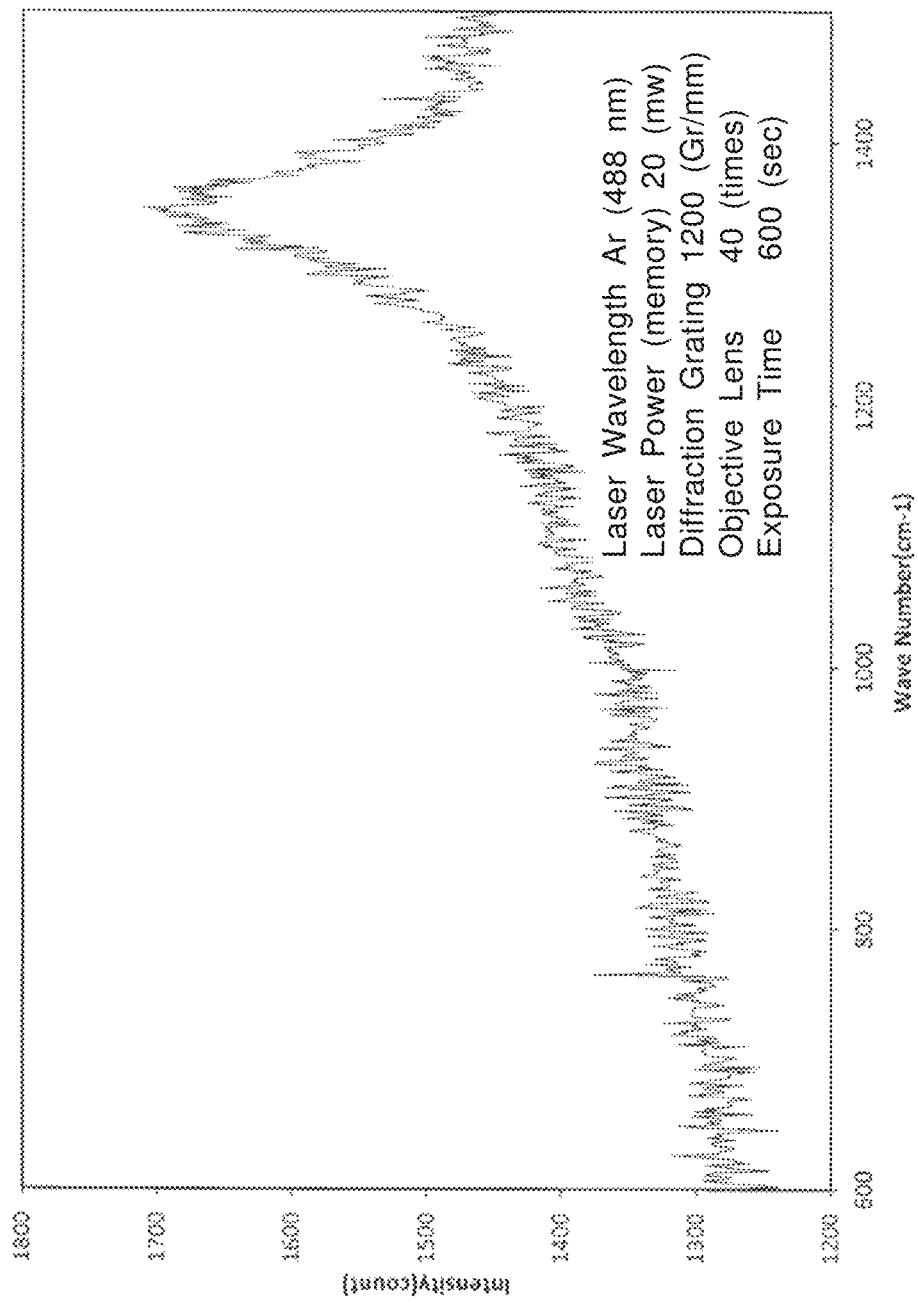
FIG. 10 shows the result of Raman spectroscopy measurement of the composites used in Example 1.

As shown in FIGS. 9 and 10, while the peaks of polytetrafluoroethylene at around 1150 $cm^{-1}$ and 1210 $cm^{-1}$ were observed in the FT-IR measurement, the peak of polytetrafluoroethylene at around 729 $cm^{-1}$ was not observed in the Raman spectroscopy measurement. It was confirmed that PTFE in the composites in such a specific state was able to lead to good repellency and insulating properties of the surface of the anode active material, and was able to suppress reductive decomposition of the aqueous electrolyte solution.

The Examples showed the case where acetylene black that is a carbon-based active material was used as the anode active material. The technique of the present disclosure is believed to be applied to materials other than a carbon-based active material as well in view of a mechanism thereof. That is, compositing the anode active material and PTFE expands the potential window of the aqueous electrolyte solution on the reduction side due to repellency and insulating properties. Thus, it is believed that the anode active material may be selected according to the expanding potential window on the reduction side.

The Examples showed the case where LiTFSI or LiFSI was dissolved in the aqueous electrolyte solution at a concentration as high as 21 mol/kg. The concentration of the electrolyte in the aqueous electrolyte solution is not restricted to this. As described above, it is believed that even if compositing PTFE in the anode active material reduces the concentration of the electrolyte in the aqueous electrolyte solution, the potential window of the aqueous electrolyte solution on the reduction side can be expanded. A low concentration of the electrolyte in the aqueous electrolyte solution has advantages such as a low viscosity of the aqueous electrolyte solution, a high velocity of travel of lithium ions, and improved power of the battery. The concentration of the electrolyte in the aqueous electrolyte solution may be determined according to the performance of the battery to be aimed. In view of further expanding the potential window of the aqueous electrolyte solution, the concentration of the electrolyte in the aqueous electrolyte solution is preferably as high as no less than 21 mol/kg.

INDUSTRIAL APPLICABILITY

The aqueous lithium ion secondary battery of this disclosure has a high operating voltage, and can be used in a wide range of power sources such as an onboard large-sized power source, and a small-sized power source for portable terminals.

REFERENCE SIGNS LIST 10 anode current collector
20 anode active material layer
 21 composite
 21a anode active material
 21b polytetrafluoroethylene
30 cathode current collector
40 cathode active material layer
 41 cathode active material
 42 conductive additive
 43 binder
50 aqueous electrolyte solution
51 separator
100 anode
200 cathode
1000 aqueous lithium ion secondary battery

What is claimed is:

1. A method for producing an aqueous lithium ion secondary battery, the method comprising:
producing an anode active material composite by: mixing a carbon-based anode active material and polytetrafluoroethylene to obtain a mixture; and heating the mixture at a temperature of no less than a glass transition temperature and lower than a vaporization temperature of the polytetrafluoroethylene to obtain a composite of the carbon-based anode active material and the polytetrafluoroethylene as the anode active material composite;
producing an anode comprising the anode active material composite;
producing a cathode;
producing an aqueous electrolyte solution;
storing the anode, the cathode, and the aqueous electrolyte solution in a battery case; and
after said storing of the anode, the cathode, and the aqueous electrolyte solution in the battery case, to configure the battery, performing charge and discharge at potentials higher than that at which the aqueous electrolyte solution decomposes to generate hydrogen and at which an electrolyte contained in the aqueous electrolyte solution decomposes to form a SEI.

2. The method according to claim 1, wherein the charge and the discharge are performed at potentials of 1.244 V (vs. Li/Li+) to 3.244 V (vs. Li/Li+).

3. The method of claim 1, wherein the anode active material composite contains 10 to 80 mass % carbon-based anode active material and 20 to 90 mass % of the polytetrafluoroethylene.

4. The method of claim 1, wherein no less than 90 mass % of an entire mass of the carbon-based anode active material of the aqueous lithium ion secondary battery is the anode active material composite.

* * * * *